(12) United States Patent
Daniels et al.

(10) Patent No.: US 12,215,407 B2
(45) Date of Patent: Feb. 4, 2025

(54) PROCESS FOR THE RECOVERY OF METALS FROM OXIDIC ORES

(71) Applicant: UMICORE, Brussels (BE)

(72) Inventors: Michel Daniels, Olen (BE); Jean Scoyer, Herentals (BE); Michael Baltes, Olen (BE); Margot Neven, Olen (BE); Jan Leyssen, Olen (BE)

(73) Assignee: UMICORE, Brussels (BE)

( * ) Notice: Subject to any disclaimer, the term of this patent is extended or adjusted under 35 U.S.C. 154(b) by 452 days.

(21) Appl. No.: 17/633,342

(22) PCT Filed: Jul. 27, 2020

(86) PCT No.: PCT/EP2020/071079
§ 371 (c)(1),
(2) Date: Feb. 7, 2022

(87) PCT Pub. No.: WO2021/028201
PCT Pub. Date: Feb. 18, 2021

(65) Prior Publication Data
US 2022/0290273 A1 Sep. 15, 2022

(30) Foreign Application Priority Data
Aug. 9, 2019 (EP) .................................. 19190915

(51) Int. Cl.
*C22B 47/00* (2006.01)
*C22B 3/00* (2006.01)
(Continued)

(52) U.S. Cl.
CPC ............ *C22B 47/0063* (2013.01); *C22B 3/08* (2013.01); *C22B 15/0071* (2013.01); *C22B 23/043* (2013.01); *C22B 23/0484* (2013.01)

(58) Field of Classification Search
CPC ... C22B 47/0063; C22B 3/08; C22B 15/0071; C22B 23/043; C22B 23/0484;
(Continued)

(56) References Cited

U.S. PATENT DOCUMENTS 3,906,075 A 9/1975 Menz
4,008,076 A 2/1977 Junghanss et al.
(Continued)

FOREIGN PATENT DOCUMENTS

AU 3130071 A 1/1973
AU 199960618 B2 8/2000
(Continued)

OTHER PUBLICATIONS

Abramovski, Tomasz et al. Technologies for the processing of polymetallic nodules from clarion clipperton zone in the pacific ocean, Journal of Chemical Technology and Metallurgy, 52, 2, 2017, 258-269 (Year: 2017).*
(Continued)

*Primary Examiner* — Brian D Walck
*Assistant Examiner* — Danielle Carda
(74) *Attorney, Agent, or Firm* — NK Patent Law

(57) ABSTRACT

A process is disclosed for the recovery of valuable metals from oxidic ores, in particular from polymetallic nodules. The process is suitable for the recovery of Cu, Co, Ni, Fe, and Mn, which are the main metals of interest in such polymetallic nodules. The present process is, among others, characterized by the handling of Fe, which is dissolved and kept in solution until the step of crystallization rather than removed at an earlier stage. A mixed Mn—Fe residue is obtained, which, after thermal treatment, provides a Mn—Fe oxide that is suitable for the steel or for the manganese industry. Excellent Cu, Co and Ni yields are obtained, while Fe is leached and valorized together with Mn.

7 Claims, 1 Drawing Sheet

(51) Int. Cl.
*C22B 3/08* (2006.01)
*C22B 15/00* (2006.01)

(58) Field of Classification Search
CPC ... C22B 23/0453; C22B 47/0081; C22B 3/44; C22B 3/46; C22B 15/0089; C22B 15/0091; C22B 15/0093; C22B 23/0461; C25C 1/12
USPC .......................................................... 75/400
See application file for complete search history.

(56) References Cited

U.S. PATENT DOCUMENTS

| | | | |
|---|---|---|---|
| 4,029,733 A | 6/1977 | Faugeras et al. | |
| 4,138,465 A | 2/1979 | Pahlman et al. | |
| 4,545,816 A | 10/1985 | Rappas | |

FOREIGN PATENT DOCUMENTS

| | | |
|---|---|---|
| CA | 1077725 A | 5/1980 |
| CN | 101072885 A | 11/2007 |
| CN | 104520454 A | 4/2015 |
| CN | 108070725 A | 5/2018 |
| DE | 2150785 B2 | 12/1972 |
| JP | S6386824 A | 4/1988 |

OTHER PUBLICATIONS

ISA/EP; International Search Report and Written Opinion for International Patent Application No. PCT/EP2020/071079 dated Sep. 14, 2020, 9 pages.

Abramovski, Tomasz, et al., "Technologies for the Processing of Polymetallic Nodules From Clarion Clipperton Zone in the Pacific Ocean", Journal of Chemical Technology and Metallurgy, Jan. 1, 2017, vol. 52, No. 2, 12 pages.

Khalafalla, Sanaa, et al., "Selective Extraction of Metals from Pacific Sea Nodules with Dissolved Sulfur Dioxide", Journal of Metals, Springer-Verlag, vol. 33, No. 8, Dec. 20, 2013, pp. 37-42.

Abramovski, Tomasz, et al., "Technologies for the Processing of Polymetallic Nodules From Clarion Clipperton Zone in the Pacific Ocean", Journal of Chemical Technology and Metallurgy, 2017, age 258-269, vol. 52, No. 2.

* cited by examiner

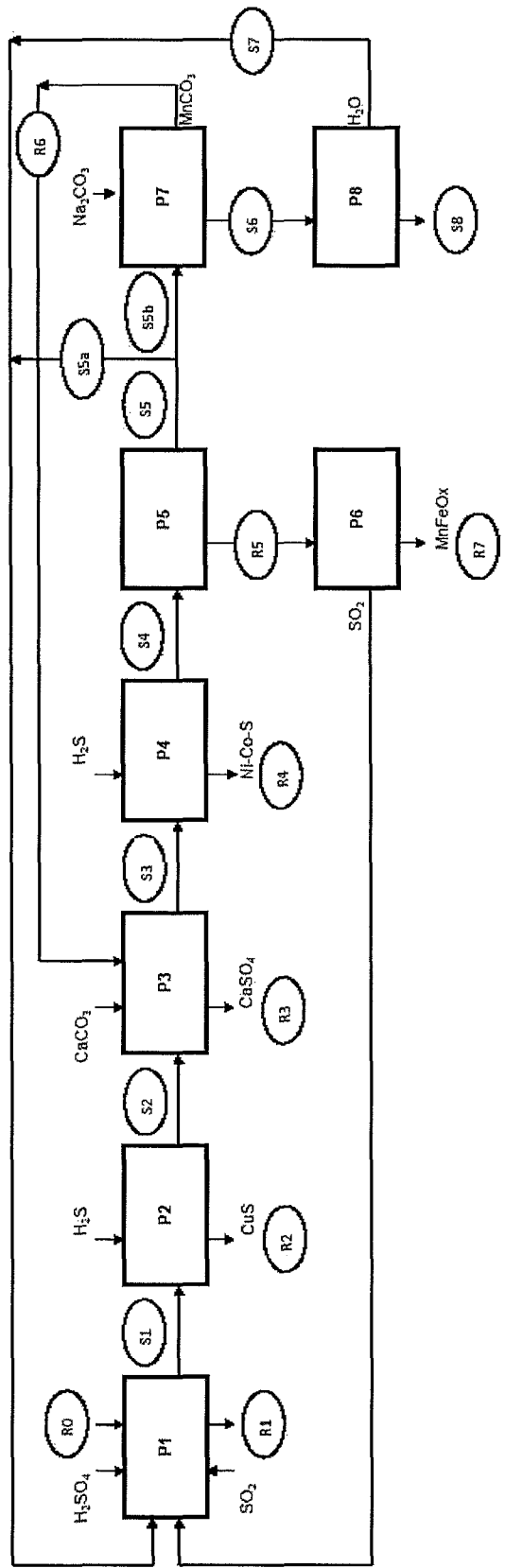

PROCESS FOR THE RECOVERY OF METALS FROM OXIDIC ORES

CROSS-REFERENCE TO RELATED APPLICATIONS

This application is a U.S. National Stage application of International Patent Application No. PCT/EP2020/071079, filed on Jul. 27, 2020, which claims the benefit of European Patent Application No. 19190915.9, filed on Aug. 9, 2019.

The present disclosure concerns a process for the recovery of valuable metals from oxidic ores, in particular from polymetallic nodules. Polymetallic nodules, also called deep sea nodules or deep sea manganese nodules, are rock concretions formed of concentric layers of iron and manganese oxides at the bottom of oceans.

The disclosed process is suitable for the recovery of Cu, Co, Ni, Fe, and Mn, which are the main metals of interest in such polymetallic nodules.

To date, the most economically interesting nodules have been found in the Clarion Clipperton Fracture Zone (CCFZ). Nodules in this area typically contain 27% Mn, 1.3% Ni, 1.1% Cu, 0.2% Co, 6% Fe, 6.5% Si, and 3% Al. Other elements of economic interest are Zn, Mo and rare earths. Other sizeable deposits have been found in the Penrhyn Basin near the Cook Islands, the Peru Basin in the southeast Pacific and in a region termed the Indian Ocean Nodule Field (IONF).

Since the seventies, many processes have been investigated to treat polymetallic nodules. A recent comprehensive review of the available processes can be found in a paper by T. Abramovski et al., Journal of Chemical Technology and Metallurgy, 52, 2, 2017, 258-269. Kennecott and INCO attempted to develop industrial processes. Kennecott developed the Cuprion ammoniacal process, while several companies developed hydrometallurgy processes in sulfate, chloride and nitrate media. INCO studied pyrometallurgical processes with production of a matte. More recently, production of an alloy has been proposed. None of these processes went further than the piloting scale.

The Cuprion process faces issues with low Co recovery, slow reduction of the nodules by CO-gas, and low quality of the manganese residue. Sulfate processes derived from lateritic processes making use of autoclave leaching to reject Mn and Fe in the leach residue, face technological issues in the leaching, as well as poor valorization of the Mn. Other sulfate-based processes lead to huge reagent consumption and/or production of fatal ammonium sulfate. Chloride and nitrate routes have high energy consumption for the regeneration of the reagents by pyro-hydrolysis and pyrolysis. Drying of nodules before pyrometallurgy processing leads also to high energy consumption.

In this context, it should be noted that U.S. Pat. No. 3,906,075 discloses a single-step leaching process using $SO_2$ and sulfuric acid. Mn, Ni, Co, and Cu are leached simultaneously. This document also illustrates the crystallization of manganese as $MnSO_4$, followed by its decomposition to oxide, thereby generating $SO_2$ for re-use in the leaching step. $MnSO_4$ is added to the leaching step as it is said to force Fe to remain undissolved. Cu is extracted from the single leachate stream. Liquid-liquid extraction is typically used, even though the cost and complexity of this process are considerable in view of the volumes to be treated.

It has been recognized in the prior art that Fe in the leachate is undesired, as an expensive de-ironing step would be needed to clean up the solution. Relatively mild leaching conditions are therefore proposed, including the addition of high concentrations of $MnSO_4$ in the leaching solution. It is assumed that the high $SO_4$ concentrations may limit the Fe solubility; however, less than optimal recovery yields are then observed for Co and Ni.

The present process is, among others, characterized by a very different handling of the Fe-related issues. There is no attempt at all to limit the leaching of Fe in the step of dissolving the ores. On the contrary, Fe is dissolved and kept in solution until the step of $MnSO_4$ crystallization. A mixed Mn—Fe residue is then obtained, which, after thermal treatment, is susceptible to result in a Mn—Fe oxide that is suitable for the steel or for the manganese industry. Excellent Cu, Co, and Ni yields are obtained, while Fe is leached and valorized together with Mn.

FIG. 1 provides an overview of the flowsheet, also including the optional process steps and streams. The process steps are identified in Table 1, and the streams in Table 2.

TABLE 1

Identification of the process steps according to FIG. 1

| Process step ID | Description |
| --- | --- |
| P1 | Dissolving the ores |
| P2 | Recovery of Cu |
| P3 | Neutralization |
| P4 | Precipitation of Co and Ni |
| P5 | Crystallization of Mn and Fe |
| P6 | Thermal decomposition |
| P7 | Precipitation of Mn (in bleed) |
| P8 | Reverse osmosis |

TABLE 2

Identification of product streams in FIG. 1

| Stream ID | Type | Description |
| --- | --- | --- |
| R0 | Feed | Ores |
| R1 | Residue | First residue, insoluble compounds in ores |
| R2 | Residue | Second residue, when Cu is precipitated using $H_2S$ |
| R3 | Residue | Third residue, when using $CaCO_3$ as neutralizing agent |
| R4 | Residue | Fourth residue, after Co and Ni are precipitated using $H_2S$ |
| R5 | Residue | Fifth residue, after Mn and Fe are precipitated by crystallization |
| R6 | Residue | Sixth residue, when Mn is precipitated from bleed stream |
| R7 | Residue | Seventh residue, when the fifth residue is thermally decomposed |
| S1 | Solution | First solution, leach solution bearing Cu, Co, Ni, Fe, and Mn |
| S2 | Solution | Second solution, bearing Co, Ni, Fe, and Mn |
| S3 | Solution | Third solution, neutralized, Co, Ni, Fe, and Mn-bearing |
| S4 | Solution | Fourth solution, Mn and Fe-bearing |

TABLE 2-continued

Identification of product streams in FIG. 1

| Stream ID | Type | Description |
|---|---|---|
| S5 | Solution | Fifth solution, mother liquor containing a minor part of the Mn and Fe |
| S5a | Solution | First fraction of fifth solution, recirculated to the step of dissolving |
| S5b | Solution | Second fraction of fifth solution, bleed stream |
| S6 | Solution | Sixth solution, depleted salt solution |
| S7 | Solution | Seventh solution, essentially $H_2O$ |
| S8 | Solution | Eighth solution, essentially a concentrated salt solution |

The disclosed process suitable for the recovery of Cu, Co, Ni, Fe, and Mn from oxidic ores, comprises the steps of dissolving the ores in acidic conditions, using $H_2SO_4$ and $SO_2$, thereby obtaining a Cu, Co, Ni, Fe, and Mn-bearing first solution and a first residue, followed by S/L separation of the first solution and of the first residue.

A suitable endpoint pH for this step would preferably be 2 or lower. Good leaching yields are then observed for the metals that are intended to be recovered, including Fe. The $SO_2$ is directly injected in the leach solution in an amount that is preferably stoichiometric with respect to the metals to be reduced.

According to a first alternative, the Cu in solution can be recovered by precipitation as a sulfide by addition of a sulfide-bearing compound, or as a metal by addition of a metal more easily oxidized than Cu, thereby obtaining a Co, Ni, Fe and Mn-bearing acidic second solution and a Cu-bearing second residue and S/L separation of the second solution and of the second residue.

According to a second alternative, the Cu can be recovered by extraction, using electrowinning or SX, thereby obtaining a Co, Ni, Fe and Mn-bearing acidic second solution and a Cu-bearing stream.

During this Cu recovery step, the pH may decrease somewhat due to the protons freed up, in particular when Cu is precipitated using $H_2S$ or NaHS as sulfide bearing compound. This decrease of pH has no detrimental effects other than requiring more acid-consuming compounds acting as neutralizing agents in the next process step, which is the neutralization to pH 2 to 5 of the second solution by addition of first acid-consuming compounds, thereby obtaining a Co, Ni, Fe, and Mn-bearing neutralized third solution.

In a next step, Co and Ni are precipitated by addition of a sulfide-bearing compound to the third solution, thereby obtaining a Fe and Mn-bearing fourth solution, and a Co and Ni-bearing fourth residue, which are separated.

During this Co and Ni recovery step, the pH may again decrease somewhat further due to the protons freed up. More neutralization agents may be added, to reach a pH of 2 to 7. It is indeed preferred to operate the next step, which is the crystallization of Mn and Fe, on a neutralized solution to avoid the corrosion of the equipment.

In the neutralization step, $CaCO_3$ may be used as acid-consuming compound. This produces gypsum, a solid that should preferably be separated in an additional S/L separation step. The production of solids requiring filtration can be avoided or minimized by using $MnCO_3$ or $Mn(OH)_2$ as neutralization agent. These two products can advantageously be generated in the treatment of a bleed stream, as described below.

Mn and Fe are recovered together from the fourth solution by crystallization, thereby obtaining a fifth solution (mother liquor) containing a minor part of the Mn, and a fifth residue containing the major part of the Mn and of the Fe. The crystals are separated from the mother liquor.

Crystallization of Mn and Fe can be performed by evaporation. Alternatively, crystallization can be induced by heating, as the solubility limits of Mn and Fe decrease strongly with temperature. A temperature of more than 120° C., or even of more than 170° C. is then preferred.

The mother liquor will still contain some residual dissolved Mn and Fe, as the crystallization will not fully exhaust these elements in the mother liquor. These metals can be recovered according to the following embodiment.

Herein, the mother liquor is split in a first and second fraction, the first fraction being recirculated to the step of dissolving. The Mn and Fe in the second fraction (bleed stream) are precipitated as carbonates or hydroxides by addition of second acid-consuming compounds such as $Na_2CO_3$ or NaOH, thereby obtaining a sixth solution depleted in Mn and Fe, and a sixth residue rich in Mn and Fe, which are separated. Referring to the description above, it is advantageous to recirculate these carbonates or hydroxides as acid-consuming compounds to the step of neutralization.

The bleed stream will also provide for an output to minor elements such as Na and K, which otherwise could accumulate to undesired levels when the process is run continuously. The second acid-consuming compounds are advantageously Na or K-based, as Ca-based compounds would lead to the dilution of the Mn in gypsum.

Another embodiment concerns a process comprising the steps of thermal decomposition of the fifth residue, thereby obtaining an oxidic Mn-bearing seventh residue and $SO_2$, and the separation and recirculation of the $SO_2$ to the step of dissolving. The thermal decomposition in this process is achieved by heating the product to 850 to 1000° C.

Another embodiment concerns a process comprising the steps of reverse osmosis of the sixth solution, thereby obtaining essentially pure water and a concentrated salt solution. The water can be reused in a previous step, e.g. for washing residues, and then recirculated to the step of dissolving the ores. The concentrated salt solution can be discharged.

Another embodiment concerns any of the above processes, wherein the ores are deep sea nodules.

The following examples further illustrate the invention.

EXAMPLE 1: NEUTRALIZATION USING CACO₃

1 kg (on dry) polymetallic nodules ground to D50 of 100 μm is blended in 3.1 L water. The slurry is continuously stirred at 500 rpm and heated to 95° C. For 1.5 hours, a total of 510 g $SO_2$ gas is blown into the slurry. Afterwards, 280 g $H_2SO_4$ is slowly added in 2 hours. During this addition, some $SO_2$ is released from the solution resulting in 400 g being effectively consumed. A pH of 1.6 is reached. The slurry is separated by filtration. The solution contains 9 g/L $H_2SO_4$. The solids are washed.

The Cu in the solution is precipitated in a first sulfide precipitation. The solution is thereby brought to 80° C. and continuously stirred at 300 rpm. Argon is blown over the liquid surface. For 2 hours, 6.2 g $H_2S$ (i.e. according to a 100% stoichiometry) is bubbled through the solution. The slurry is filtered, and the solids washed with water and dried in a vacuum stove at 40° C. This solution now contains 14 g/L $H_2SO_4$.

The solution needs to be neutralized to achieve a successful Ni and Co precipitation. To this end, the solution is brought to 75° C., stirred at 300 rpm, and argon is blown over the liquid surface. 51.2 g $CaCO_3$ is brought in suspension in 0.15 L water. This slurry is slowly added to the solution. Gypsum is formed, which is separated. The pH of the solution then reaches the target value 3.

Ni and Co are recovered from the solution using NaHS. The solution is brought to 70° C. and continuously stirred at 300 rpm. Argon is blown over the liquid surface. 264 mL NaHS solution containing 38 g S/L (i.e. according to a 120% stoichiometry) is added to the solution at a rate of 3 mL/min. The slurry is filtered, and the solids are washed with water and dried in a vacuum stove at 40° C.

The solution is loaded in an autoclave and brought to 176° C. Under these conditions, the solubility of both $MnSO_4$ and $FeSO_4$ decreases, resulting in their crystallization. The crystals are separated from the liquid phase using hot filtration to prevent redissolution of the crystals.

The amounts and compositions of the different filtrates and residues are given in Table 3. The yields of the dissolving (P1) and precipitation steps (P2, P4, P5) are given in Table 4.

TABLE 4

Metal yields (in %) per process step

| Process step ID | Mn | Ni | Co | Cu | Fe | Si | Al |
|---|---|---|---|---|---|---|---|
| P1 | 99 | 99 | 99 | 96 | 69 | 0 | 29 |
| P2 | 0 | 0 | 0 | 100 | 0 | 0 | 0 |
| P4 | 0.1 | 100 | 100 | 100 | 1 | 0 | 14 |
| P5 | 88 | 0 | 0 | 0 | 85 | 0 | 97 |

The metal yields per process step are considered as most satisfying.

EXAMPLE 2: NEUTRALIZATION USING MNCO₃

This Example is analogous to Example 1. However, recirculated Mn and Fe carbonates are used as neutralizing agent instead of $CaCO_3$. Consequently, no gypsum is formed, and the corresponding filtration step is eliminated.

After the Cu precipitation, the solution needs to be neutralized. To this end, a fraction of the pumpable slurry, prepared as shown below, is slowly added to the solution as acid-consuming compounds. When adding an amount containing 58.8 g of a mixture of Mn and Fe carbonates, the pH of the solution reaches the target value of 3.

Mn and Fe are then recovered by crystallization, according to Example 1.

The Mn and Fe still present in the mother liquor after the crystallization step are precipitated as carbonates by the addition of 66.8 g $Na_2CO_3$. The slurry is filtered, and the residue is washed and dried. It contains 92.4 g of a mixture of Mn and Fe carbonates. This residue is then diluted with 0.28 L water to create a pumpable slurry. Part of this slurry is used as acid consuming compounds in the above-described step.

It should be noted that in a continuous process, it would be advantageous to perform the precipitation step on only a fraction of the mother liquor, this fraction being determined by the need for acid-consuming compounds in the neutralization step. The remainder of the mother liquor can then be recirculated to the dissolution step.

The amounts and compositions of the different filtrates and residues are given in Table 5. The yields of the dissolving (P1) and precipitation steps (P2, P4, P5) are given in Table 6.

TABLE 3

Amounts and compositions (solutions in L and g/L, residues in g and wt. %)

| Stream ID | Mass (g) | Volume (L) | Mn | Ni | Co | Cu | Fe | Si | Al |
|---|---|---|---|---|---|---|---|---|---|
| R0 | 1000.0 | — | 29 | 1.3 | 0.25 | 1.2 | 6.2 | 6.3 | 2.7 |
| S1 | — | 3.59 | 80 | 3.6 | 0.69 | 3.2 | 12 | 0.0 | 2.2 |
| R1 | 300.0 | — | 0.97 | 0.04 | 0.01 | 0.16 | 6.4 | 21 | 6.4 |
| S2 | — | 3.59 | 80 | 3.6 | 0.69 | 0.0 | 12 | 0.0 | 2.2 |
| R2 | 17.3 | — | 0.0 | 0.0 | 0.0 | 66 | 0.0 | 0.0 | 0.0 |
| S3 | — | 3.74 | 77 | 3.4 | 0.66 | 0.0 | 11 | 0.0 | 2.1 |
| S4 | — | 3.74 | 77 | 0.0 | 0.0 | 0.0 | 11 | 0.0 | 1.8 |
| R4 | 28.1 | — | 1.0 | 46 | 8.8 | 0.0 | 1.5 | 0.0 | 3.9 |
| S5 | — | 3.66 | 9 | 0.0 | 0.0 | 0.0 | 1.7 | 0.0 | 0.06 |
| R5 | 900.45 | — | 28 | 0.0 | 0.0 | 0.0 | 4.0 | 0.0 | 0.7 |

TABLE 5

Amounts and compositions (solutions in L and g/L, residues in g and wt. %)

| Stream ID | Mass (g) | Volume (L) | Mn | Ni | Co | Cu | Fe | Si | Al |
|---|---|---|---|---|---|---|---|---|---|
| R0 | 1000.0 | — | 29 | 1.3 | 0.25 | 1.2 | 6.2 | 6.3 | 2.7 |
| S1 | — | 3.59 | 80 | 3.6 | 0.69 | 3.2 | 12 | 0.0 | 2.2 |
| R1 | 300.0 | — | 0.97 | 0.04 | 0.01 | 0.16 | 6.4 | 21 | 6.4 |
| S2 | — | 3.59 | 80 | 3.6 | 0.69 | 0.0 | 12 | 0.0 | 2.2 |
| R2 | 17.3 | — | 0.0 | 0.0 | 0.0 | 66 | 0.0 | 0.0 | 0.0 |
| S3 | — | 3.77 | 83 | 3.4 | 0.66 | 0.0 | 13 | 0.0 | 2.1 |
| S4 | — | 3.77 | 82 | 0.0 | 0.0 | 0.0 | 12 | 0.0 | 1.8 |
| R4 | 28.2 | — | 1.1 | 46 | 8.8 | 0.0 | 1.7 | 0.0 | 3.9 |
| S5 | — | 3.67 | 10 | 0.0 | 0.0 | 0.0 | 1.9 | 0.0 | 0.06 |
| R5 | 973.2 | — | 28 | 0.0 | 0.0 | 0.0 | 4.1 | 0.0 | 0.7 |
| R6 | 58.8 | — | 40 | 0.0 | 0.0 | 0.0 | 7.6 | 0.0 | 0.0 |

TABLE 6

Metal yields (in %) per process step

| Process step ID | Mn | Ni | Co | Cu | Fe | Si | Al |
|---|---|---|---|---|---|---|---|
| P1 | 99 | 99 | 99 | 96 | 69 | 0 | 29 |
| P2 | 0 | 0 | 0 | 100 | 0 | 0 | 0 |
| P4 | 0.1 | 100 | 100 | 100 | 1 | 0 | 14 |
| P5 | 88 | 0 | 0 | 0 | 85 | 0 | 97 |

Even though the yields per process step are equally satisfying as in Example 1, the overall Mn yield will be higher when applying the neutralization method according to Example 2. Indeed, most of the Mn in the mother liquor after crystallization will in this case be recovered and brought out in the crystallization step.

The invention claimed is:

1. A process for the recovery of Cu, Co, Ni, Fe and Mn from oxidic ores, comprising the steps of:
    dissolving the oxidic ores (P1) in acidic conditions using $H_2SO_4$ and $SO_2$, thereby obtaining a Cu, Co, Ni, Fe, and Mn-bearing first solution (S1) and a first residue (R1);
    Solid/Liquid (S/L) separation of the first solution and of the first residue;
    recovering Cu (P2) by:
        precipitation as a sulfide by addition of a sulfide-bearing compound, or as a metal by addition of a metal more easily oxidized than Cu, thereby obtaining a Co, Ni, Fe, and Mn-bearing acidic second solution (S2) and a Cu-bearing second residue (R2) and S/L separation of the second solution and of the second residue;
    or by:
        extraction by electrowinning or solvent extraction (SX), thereby obtaining a Co, Ni, Fe, and Mn-bearing acidic second solution (S2) and a Cu-bearing stream;
    neutralizing (P3) the second solution (S2) to pH 2 to 5 by addition of first acid-consuming compounds, thereby obtaining a Co, Ni, Fe, and Mn-bearing neutralized third solution (S3);
    precipitating Co and Ni (P4) by adding a sulfide-bearing compound to the third solution, thereby obtaining an Fe and Mn-bearing fourth solution (S4) and a Co and Ni-bearing fourth residue (R4);
    S/L separation of the fourth solution and of the fourth residue;
    crystallizing Mn and Fe (P5) as sulfates from the fourth solution, thereby obtaining a fifth solution containing a minor part of the Mn (S5), and a fifth residue containing the major part of the Mn and of the Fe (R5); and
    S/L separation of the fifth solution and of the fifth residue.

2. The process according to claim 1, wherein, in the neutralization step, the first acid-consuming compound contains calcium, thereby obtaining a third residue (R3), and further comprising the additional step of S/L separation of the third solution and of the third residue.

3. The process according to claim 1, further comprising the steps of:
    splitting the fifth solution (S5) into a first fraction (S5a) and second fraction (S5b);
    recirculating the first fraction of the fifth solution to the step of dissolving (P1);
    precipitating Mn and Fe (P7) as carbonates or hydroxides by addition of second acid-consuming compounds to the second fraction of the fifth solution, thereby obtaining a sixth solution depleted in Mn and Fe (S6), and a sixth residue rich in Mn and Fe (R6);
    S/L separation of the sixth solution and of the sixth residue; and
    recirculating the sixth residue to the step of neutralization (P3), as at least part of the first acid-consuming compounds.

4. The process according to claim 1, comprising the steps of:
    thermal decomposition (P6) of the fifth residue, thereby obtaining an oxidic Mn-bearing seventh residue (R7) and $SO_2$;
    separating the $SO_2$; and
    recirculating the $SO_2$ to the step of dissolving the ores (P1).

5. The process according to claim 1, comprising the steps of:
    reverse osmosis (P8) of the sixth solution, thereby obtaining water (S7) and concentrated salt solution (S8); and, recirculating the water to the step of dissolving the ores (P1).

6. The process according to claim 1, wherein the ores are deep sea nodules.

7. The process according to claim 1, wherein Cu is recovered from the first solution (S1).

* * * * *